US012694301B1

(12) United States Patent (10) Patent No.: US 12,694,301 B1
Antebi et al. (45) Date of Patent: Jul. 28, 2026

(54) LANGUAGE MODEL TRAINING FOR DIRECT PREFERENCE OPTIMIZATION AND IMPROVED LANGUAGE MODEL

(71) Applicant: Intuit Inc., Mountain View, CA (US)

(72) Inventors: Sagiv Antebi, Petah Tikva (IL); Matan Vetzler, Petah Tikva (IL); Gidi Zilbar, Petah Tikva (IL); Ofir Ben Shoham, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/206,856

(22) Filed: May 13, 2025

(51) Int. Cl.
 *G06N 3/0985* (2023.01)
(52) U.S. Cl.
 CPC .................................. *G06N 3/0985* (2023.01)
(58) Field of Classification Search
 CPC .................................................. G06N 3/0985
 See application file for complete search history.

(56) References Cited

U.S. PATENT DOCUMENTS

2016/0307098 A1* 10/2016 Goel ...................... G06N 3/045

FOREIGN PATENT DOCUMENTS

CN  118114742 B  * 10/2024  ........... G06F 16/955
CN  118569388 B  * 11/2024  ........... G06F 16/583

OTHER PUBLICATIONS

Wu, Junkang, et al. "$\beta $-DPO: Direct Preference Optimization with Dynamic $\beta$." Advances in Neural Information Processing Systems 37 (2024): 129944-129966 (Year: 2024).*
Azar, Mohammad Gheshlaghi, et al. "A general theoretical paradigm to understand learning from human preferences." International Conference on Artificial Intelligence and Statistics. PMLR, 2024 (Year: 2024).*
Rafailov, Rafael, et al. "Direct preference optimization: Your language model is secretly a reward model." Advances in Neural Information Processing Systems 36 (2023): 53728-53741 (Year: 2023).*
Pang, Richard Yuanzhe, et al. "Iterative reasoning preference optimization." Advances in Neural Information Processing Systems 37 (2024): 116617-116637 (Year: 2024).*

(Continued)

*Primary Examiner* — Michael J Huntley
*Assistant Examiner* — Jasmine Thanh Thai
(74) *Attorney, Agent, or Firm* — Lathrop GPM LLP

(57) ABSTRACT

A method for training a language model including executing, a number of times, a training step. The training step includes executing, on a prompt, a preferred output, and a non-preferred output, a reference language model to generate a reference score and a policy score. A loss function includes a combination of the policy score and the reference score, and a hyperparameter that modifies the combination of the policy score and the reference score. The hyperparameter includes a variable term, $\alpha$, that varies with a number of training steps performed. An updated parameter is generated from the loss. The language model is updated by adjusting an initial parameter of the training language model to the updated parameter. The method also includes returning, after convergence, the updated language model as the improved language model.

20 Claims, 7 Drawing Sheets

(56)          References Cited

OTHER PUBLICATIONS

Raghavendra, Mohit, Junmo Kang, and Alan Ritter. "Balancing the Budget: Understanding Trade-offs Between Supervised and Preference-Based Finetuning." arXiv preprint arXiv:2502.11284 (2025) (Year: 2025).*

Xu, Ruijie, et al. "Just Say What You Want: Only-prompting Self-rewarding Online Preference Optimization." arXiv preprint arXiv: 2409.17534 (2024) (Year: 2024).*

Rafailov, Rafael, et al. "Scaling laws for reward model overoptimization in direct alignment algorithms." Advances in Neural Information Processing Systems 37 (2024): 126207-126242. (Year: 2024).*

Hong, Ilgee, et al. "Adaptive preference scaling for reinforcement learning with human feedback." Advances in Neural Information Processing Systems 37 (2024): 107249-107269. (Year: 2024).*

Biderman, Stella, et al. "Pythia: A suite for analyzing large language models across training and scaling." International Conference on Machine Learning. PMLR, 2023. (Year: 2023).*

Wu, Junkang, et al. "$\alpha $-DPO: Adaptive Reward Margin is What Direct Preference Optimization Needs." arXiv preprint arXiv: 2410.10148 (2024). (Year: 2024).*

Rafailov, Rafael, et al. "Direct Preference Optimization: Your Language Model is Secretly a Reward Model." arXiv preprint arXiv: 2305.18290 (2023) (Year: 2024).*

Hong, Ilgee, et al. "Adaptive Preference Scaling for Reinforcement Learning with Human Feedback." arXiv preprint arXiv: 2406.02764 (2024). (Year: 2024).*

Wu, J., et al., "β-DPO: Direct Preference Optimization with Dynamic β", Part of Advances in Neural Information Processing Systems 37, Jan. 1, 2024, 23 pages.

* cited by examiner $$Loss = -\log\left(\sigma\left(\beta * \log\left(\frac{R_{policy}}{R_{reference}}\right)\right)\right)$$

126A

126B $\beta = f(\alpha), where\ \alpha\ varies\ with\ the\ number\ of\ training\ steps$

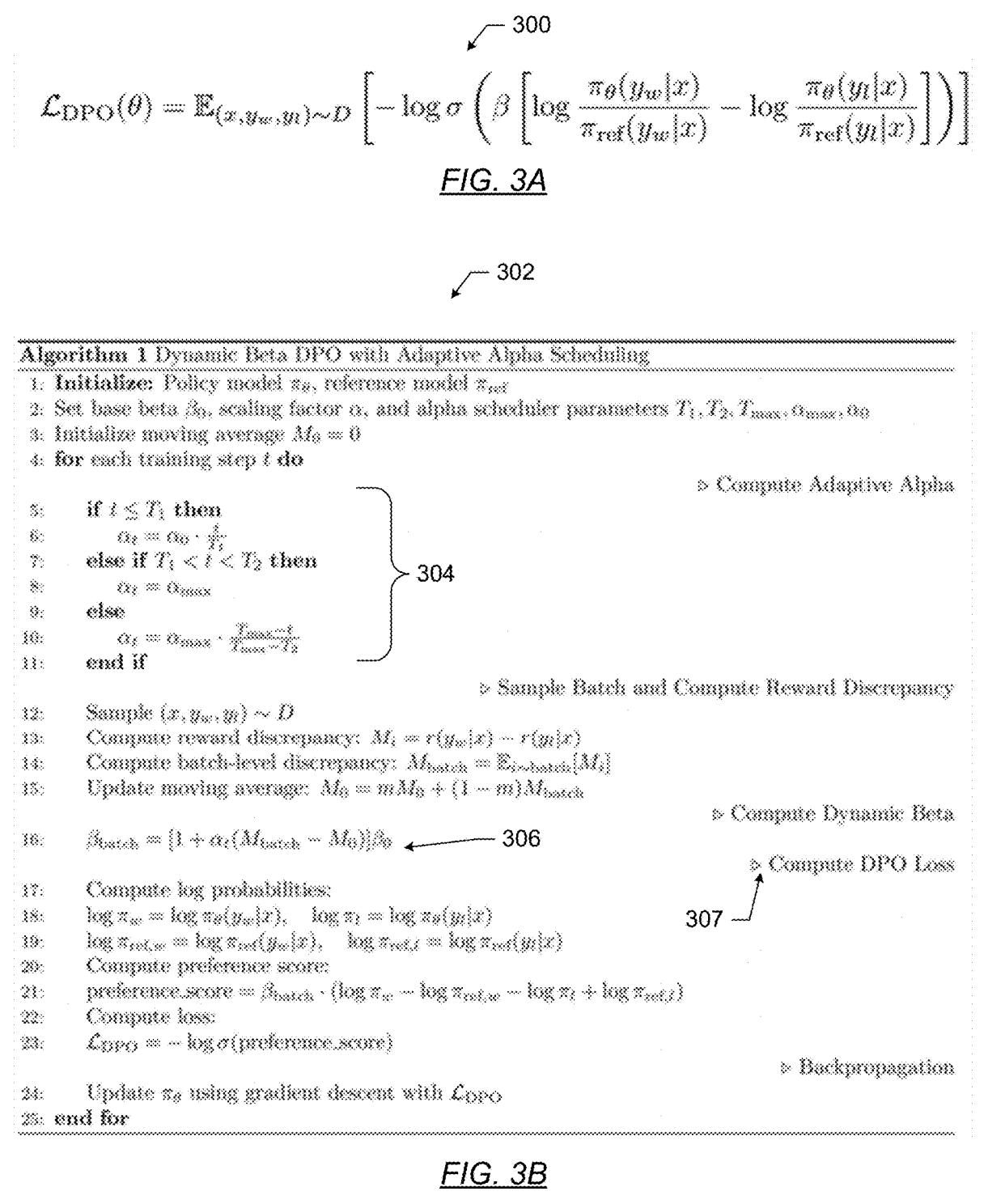

300

$$\mathcal{L}_{\text{DPO}}(\theta) = \mathbb{E}_{(x,y_w,y_l)\sim D}\left[-\log\sigma\left(\beta\left[\log\frac{\pi_\theta(y_w|x)}{\pi_{\text{ref}}(y_w|x)} - \log\frac{\pi_\theta(y_l|x)}{\pi_{\text{ref}}(y_l|x)}\right]\right)\right]$$

Algorithm 1 Dynamic Beta DPO with Adaptive Alpha Scheduling
1: Initialize: Policy model $\pi_\theta$, reference model $\pi_{\text{ref}}$
2: Set base beta $\beta_0$, scaling factor $\alpha$, and alpha scheduler parameters $T_1, T_2, T_{\max}, \alpha_{\max}, \alpha_0$
3: Initialize moving average $M_0 = 0$
4: for each training step $t$ do
                                                    ▷ Compute Adaptive Alpha
5:      if $t \le T_1$ then
6:          $\alpha_t = \alpha_0 \cdot \frac{t}{T_1}$
7:      else if $T_1 < t < T_2$ then
8:          $\alpha_t = \alpha_{\max}$
9:      else
10:         $\alpha_t = \alpha_{\max} \cdot \frac{T_{\max} - t}{T_{\max} - T_2}$
11:      end if

304

▷ Sample Batch and Compute Reward Discrepancy
12:      Sample $(x, y_w, y_l) \sim D$
13:      Compute reward discrepancy: $M_i = r(y_w|x) - r(y_l|x)$
14:      Compute batch-level discrepancy: $M_{\text{batch}} = \mathbb{E}_{i\sim\text{batch}}[M_i]$
15:      Update moving average: $M_0 = mM_0 + (1-m)M_{\text{batch}}$
                                                ▷ Compute Dynamic Beta
16:      $\beta_{\text{batch}} = [1 + \alpha_t(M_{\text{batch}} - M_0)]\beta_0$    ←——— 306
                                                    ▷ Compute DPO Loss
17:      Compute log probabilities:
18:      $\log\pi_w = \log\pi_\theta(y_w|x), \quad \log\pi_l = \log\pi_\theta(y_l|x)$        307
19:      $\log\pi_{\text{ref},w} = \log\pi_{\text{ref}}(y_w|x), \quad \log\pi_{\text{ref},l} = \log\pi_{\text{ref}}(y_l|x)$
20:      Compute preference score:
21:      preference_score $= \beta_{\text{batch}} \cdot (\log\pi_w - \log\pi_{\text{ref},w} - \log\pi_l + \log\pi_{\text{ref},l})$
22:      Compute loss:
23:      $\mathcal{L}_{\text{DPO}} = -\log\sigma(\text{preference\_score})$
                                                    ▷ Backpropagation
24:      Update $\pi_\theta$ using gradient descent with $\mathcal{L}_{\text{DPO}}$
25: end for

*FIG. 3B*

$$\alpha(t) = \begin{cases} \alpha_0 \cdot \frac{t}{T_1}, & t \leq T_1, \\ \alpha_{\max}, & T_1 < t < T_2, \\ \alpha_{\max} \cdot \frac{(T_{\max} - t)}{(T_{\max} - T_2)}, & t \geq T_2. \end{cases} \Big\} 304$$

400
COMPUTING
SYSTEM

LANGUAGE MODEL TRAINING FOR DIRECT PREFERENCE OPTIMIZATION AND IMPROVED LANGUAGE MODEL

BACKGROUND

A language model is a type of machine learning model, often a neural network, used to predict the probability of a sequence of words in a language. The language model learns patterns and dependencies within a language by analyzing a large corpus of text and assigning probabilities to different word sequences. In this manner, a language model can generate new text based on a prompt, translate languages, answer questions, summarize selected texts, and perform other useful functions.

Language models, being a type of machine learning model, are trained prior to use. Training a language model involves adjusting the weights or parameters of the model during an iterative testing-modification process. Thus, for example, the weights and parameters that define the relationships between layers and nodes in the neural network are iteratively modified during the training process. Training improves the accuracy of the language model.

In more detail, training a language model involves inputting training data to the language model to generate training outputs. The training outputs are compared to expected outputs. For supervised training, the expected outputs may be labels associated with a given input. For unsupervised learning, the expected outputs may be previous outputs from the machine learning model. The difference between the training output and the expected output may be processed with a loss function.

The loss function is used to generate a loss. The loss is then used to identify updates to the weights or parameters of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

SUMMARY

One or more embodiments provide for a method for training a language model. The method includes executing, a number of times, a training step. The training step includes executing, on a prompt, a preferred output, and a non-preferred output, a reference language model to generate a reference score. The training step also includes executing, on the prompt, the preferred output, and the non-preferred output, a training language model to generate a policy score. The training step also includes executing a loss function. The loss function includes a combination of the policy score and the reference score. The loss function further includes a hyperparameter that modifies the combination of the policy score and the reference score. The hyperparameter includes a variable term, $\alpha$, that varies with a number of training steps performed, including the training step. Executing the loss function outputs a loss. The training step also includes generating, from the loss, an updated parameter. The training step also includes updating the training language model by adjusting an initial parameter of the training language model to the updated parameter. Updating generates an updated language model. The training step also includes incrementing the number of trainings steps. The method also includes determining, after executing the training step the number of times, that convergence has occurred. The method also includes returning, after convergence, the updated language model as the improved language model.

One or more embodiments also provide for a system for training a language model. The system includes a computer processor and a data repository in communication with the computer processor. The data repository stores a prompt. The data repository also stores a preferred output and a non-preferred output. The data repository also stores a reference score and a policy score. The data repository also stores a variable term, $\alpha$, that varies with a number of training steps performed. The data repository also stores a loss function. The loss function includes a combination of the policy score and the reference score. The loss function further includes a hyperparameter that modifies the combination of the policy score and the reference score. The variable term, $\alpha$, varies with the number of training steps performed. The data repository also stores a loss output by executing the loss function. The system also includes a reference language model including a reference initial parameter and executable by the computer processor. The system also includes a training language model including an updatable parameter and executable by the computer processor. The system also includes an updated language model including the training language model having a final updated parameter and executable by the computer processor. The system also includes a training controller which, when executed by the computer processor, executes, a number of times, a training step of the number of training steps. The training step includes executing, on the prompt, the preferred output, and the non-preferred output, the reference language model to generate the reference score. The training step also includes executing, on the prompt, the preferred output, and the non-preferred output, the training language model to generate the policy score. The training step also includes executing the loss function to output the loss. The training step also includes generating, from the loss, an update to the updatable parameter. The training step also includes updating the training language model by adjusting the updatable parameter of the training language model according to the update. The training step also includes incrementing the number of trainings steps. The system also includes a server controller executable by the computer processor to determine, after executing the training step the number of times, that convergence has occurred. The server controller is also executable by the computer processor to return, after convergence, the updated language model as the improved language model.

One or more embodiments provide for another method for training a language model. The method includes executing, a number of times, a training step. The training step includes executing, on a prompt, a preferred output, and a non-preferred output, a reference language model to generate a reference score. The training step also includes executing, on the prompt, the preferred output, and the non-preferred output, a training language model to generate a policy score. The training step also includes executing a loss function. The loss function includes a combination of the policy score and the reference score. The loss function further includes a hyperparameter that modifies the combination of the policy score and the reference score. The hyperparameter includes a variable term, $\alpha$, that varies with a number of training steps performed, including the training step. The variable term, $\alpha$, includes an increasing phase, a stable phase, and a decreasing phase. During the increasing phase, a value of the variable term, $\alpha$, increases with the number of training steps. During the stable phase, the value of the variable term, $\alpha$, remains unchanged with the number of training steps. During the decreasing phase, the value of the variable term, α, decreases with the number of training steps. Executing the loss function outputs a loss. The training step also includes generating, from the loss, an updated parameter. The training step also includes updating the training language model by adjusting an initial parameter of the training language model to the updated parameter. Updating generates an updated language model. The training step also includes incrementing the number of trainings steps. The method also includes determining, after executing the training step the number of times, that convergence has occurred. The method also includes returning, after convergence, the updated language model as the improved language model. The training step improves an alignment of the improved language model to the preferred output over the non-preferred output, relative to the training language model. The training step increases a stability of the improved language model relative to the training language model.

Other aspects of one or more embodiments will be apparent from the following description and the appended claims.

BRIEF DESCRIPTION OF DRAWINGS

FIG. 3A, FIG. 3B, FIG. 3C, and FIG. 3D show an example of language model training for direct preference optimization and generation of an improved language model, in accordance with one or more embodiments.

Like elements in the various figures are denoted by like reference numerals for consistency.

DETAILED DESCRIPTION

One or more embodiments are directed to a specific technical solution to a specific technical problem in machine learning training. In summary, the specific technical problem is that training a language model using a technique known as direct preference optimization (DPO) may cause the language model either to fail to fully align with human feedback or to become unstable in terms of becoming too detached from an original reference distribution. As a result of the technical problem, a language model may not perform as desired due to suboptimal training of the language model.

The technical solution involves changing the loss function used to train the model by introducing a term that varies the value of the loss function according to the number of training steps performed during the training process. As a result, the model is trained differently, resulting in an enhanced language model that is both aligned with human preferences and which is stable in terms of an original reference distribution.

To describe the training technique in more detail, a brief summary of the direct preference optimization (DPO) language model training technique is described. DPO uses preference data when training a language model. The preference data includes a dataset of triplets. Each triplet includes a prompt, a chosen answer, and a rejected answer.

A prompt is a command to the language model to generate an output. However, the same prompt applied to a language model multiple times may generate different language model outputs. In some cases, some of the differently worded answers may be incorrect, awkwardly worded, or otherwise undesirable as perceived by a human user.

Thus, in DPO, each triplet of preference data includes a prompt, an answer generated by the language model to that prompt which is also indicated as being an answer approved by a human user or by an evaluation language model (the chosen answer), and another answer generated by the language model to that prompt which is also indicated as being rejected by the human user or by an evaluation language model (the rejected answer). Accordingly, each triplet includes a prompt, a chosen answer, and a rejected answer.

Figure 1A:
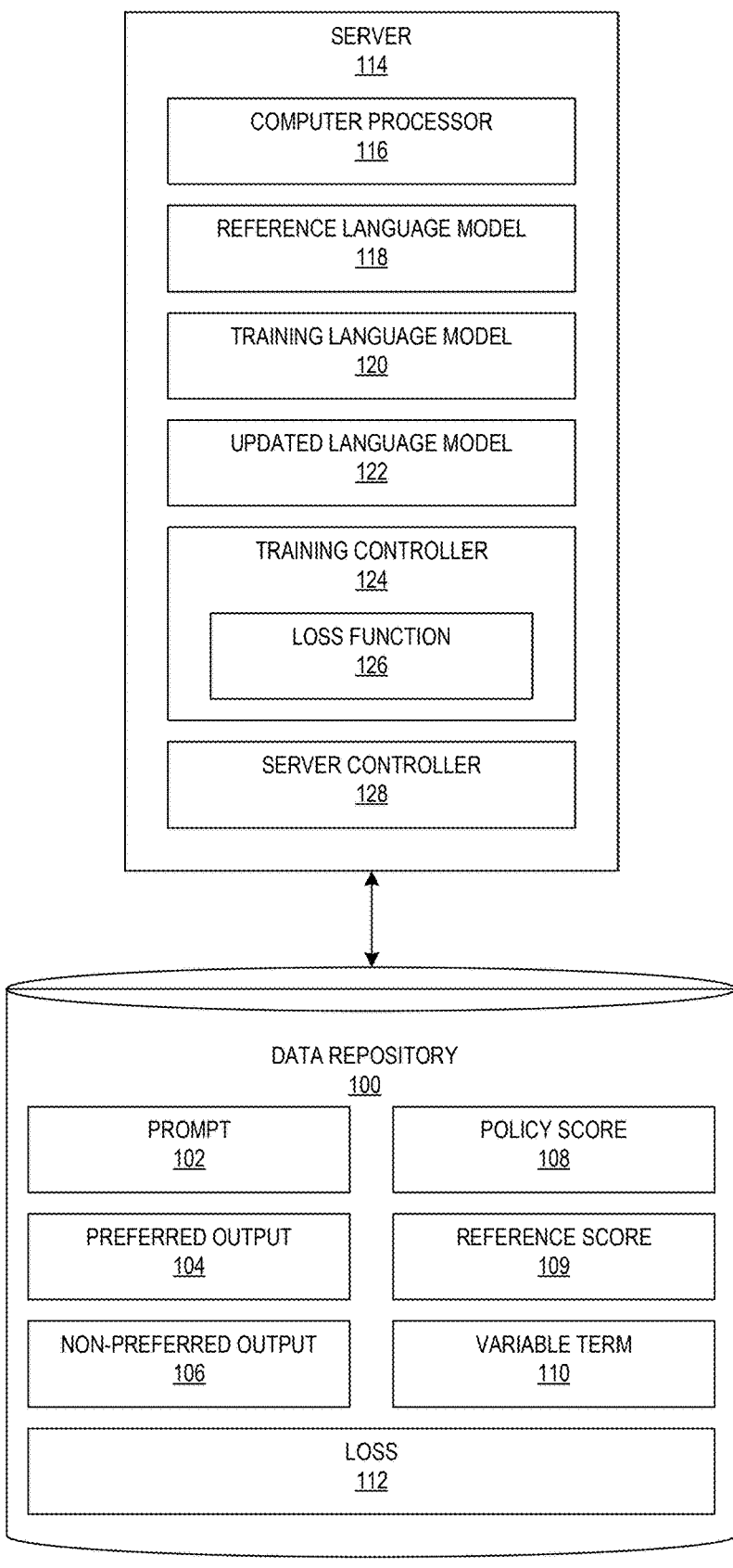
FIG. 1A and FIG. 1B show a computing system for language model training for direct preference optimization and generation of an improved language model, in accordance with one or more embodiments.
Figure 1B:
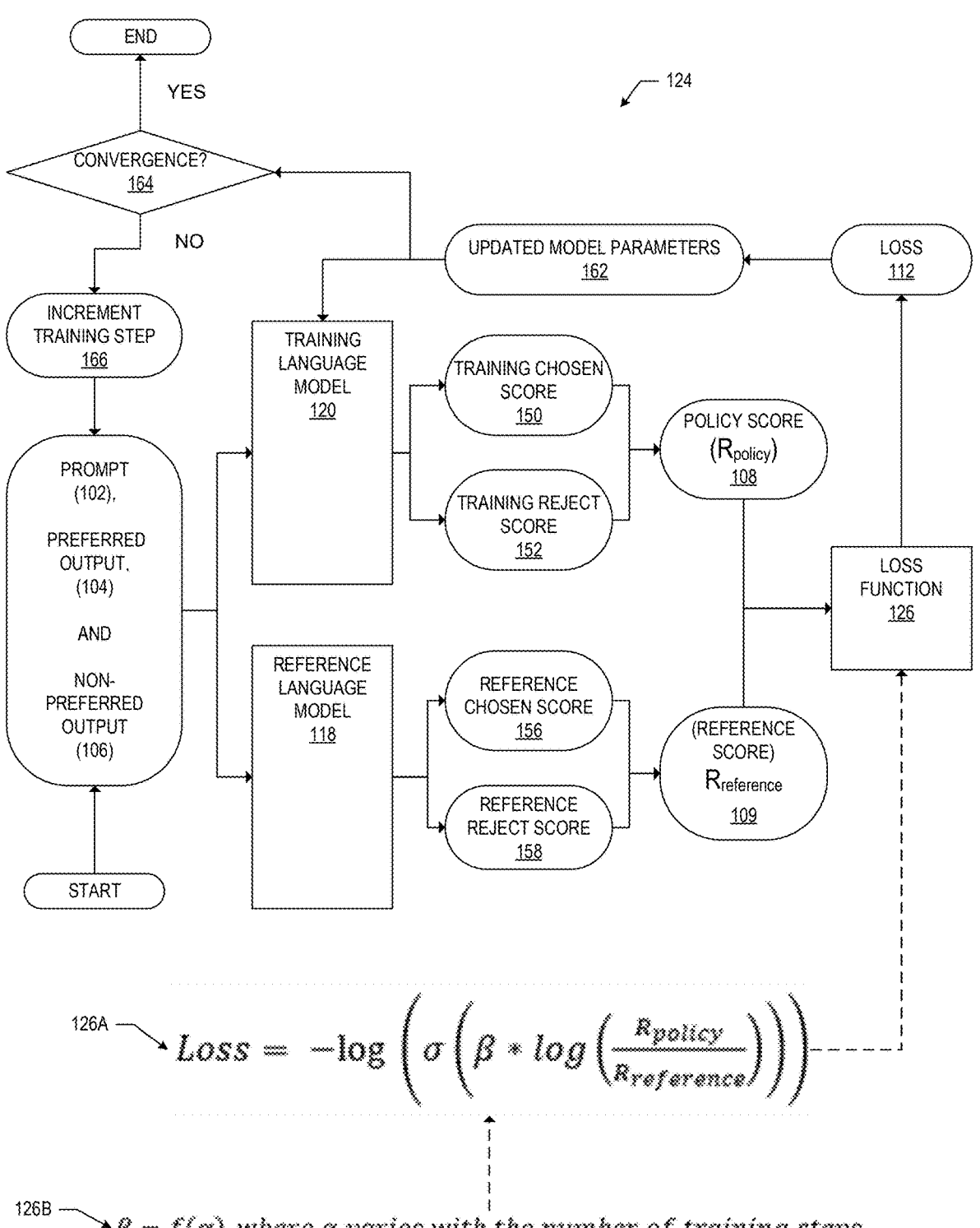

As shown in the training controller of FIG. 1B, the triplets of preference data are used to iteratively train the language model. As a result of training, the trained language model is more likely to output answers that will be preferred by a human user or an evaluation language model.

The DPO training procedure uses a particular loss function, described in more detail in FIG. 1B. As indicated above, the loss function is used to determine a loss. In turn, the loss is used to determine changes to the weights or parameters of the language model being trained. The training process is repeated using the preference data. The training process continues to repeat until convergence. Convergence occurs when a certain number of training steps have been accomplished, or when outputs of an updated version of the language model are within a quantitatively measured difference of expected outputs of the updated language model.

As indicated above, the DPO training process has technical problems. One of the technical problems is that the trained language model may fail to fully align with human or evaluation model feedback (the chosen answers). Another of the technical problems is that, over time, the trained language model may become unstable in terms of the outputs of the trained model becoming too detached from an original reference distribution of outputs of the language model prior to DPO training. As a result of the technical problems, a language model trained using DPO may not perform as desired (e.g., the trained model may start generating rejected answers).

One or more embodiments address the technical problems described above by modifying the training technique. In particular, one or more embodiments improve the loss function used during DPO training. Still more particularly, one or more embodiments introduce a variable term in the loss function (see FIG. 1B as exemplified by FIG. 3D) that, as shown by empirical testing, improves the stability and the accuracy of the trained language model. In other words, the improved loss function of one or more embodiments improves the training process, thereby resulting in an improved language model that is more likely to generate chosen answers and less likely to destabilize over time (i.e., is more likely to remain stable relative to the reference model from which the trained model is generated).

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a prompt (102). The prompt (102) is a string of alphanumeric characters and spaces, typically in the form of human-readable text. The prompt (102) expresses a command to a language model (i.e., the reference language model (118), the training language model (120), or the updated language model (122)). The prompt (102) includes at least a command to the language model to perform a function (e.g., summarize text, generate text based on a prompt, answer a query, etc.). The prompt (102) may include other commands to the language model, such as system messages that constrain how the language model should approach executing the command (i.e., constraints on how the output is generated).

In one or more embodiments, the data repository (100) stores multiple prompts (i.e., the prompt (102) is one of many prompts stored in the data repository (100)). The prompt (102) is part of a triplet of information that also includes the preferred output (104) and the non-preferred output (106), defined below.

The data repository (100) also stores a preferred output (104). The preferred output (104) is a previously generated output of the reference language model (118) (defined below) that has been labeled as being "preferred." The preferred output (104) is generated in response to the prompt (102). In other words, the preferred output (104) is an output, generated by the reference language model (118) when executing on the prompt (102), that is labeled as being "preferred."

The label may be applied by an evaluation machine learning model (i.e., another trained language model). The evaluation machine learning model may be prompted to compare the preferred output (104) to the non-preferred output (106), and then select which of the two outputs should be preferred on the bases of grammar, clarity, readability, and accuracy. The evaluation machine learning model outputs the preferred output (104) as being "preferred."

Alternatively, a computer scientist or other user may compare the outputs (preferred and non-preferred) and assign the labels accordingly. For example, a human reviewer may compare the preferred output (104) to other outputs (e.g., the non-preferred output (106) defined below) and deem that the preferred output (104) is "better." The human reviewer then labels the preferred output (104) as being "preferred."

In another variation, a combination of human users and machine learning models may label the prompts. For example, the evaluation machine learning model may output a confidence score indicating a probability, as evaluated by the machine learning model, that the label is correct. If the probability fails to satisfy a threshold value, then the outputs in question are provided to a human reviewer who will assign the labels of preferred or non-preferred to the outputs.

The preferred output (104) is one of the triplets of information described above. As indicated above, each triplet includes the prompt (102), the preferred output (104) of the reference language model (118) when executed on the prompt (102), and the non-preferred output (106) of the reference language model (118) when executed on the prompt (102). Because multiple prompts are executed on the reference language model (118), multiple preferred outputs are stored in the data repository (100).

The data repository (100) also stores a non-preferred output (106). The non-preferred output (106) is also an output of the reference language model (118) when prompted with the prompt (102). However, as indicated above, the reference language model (118) may not generate the same output to the same prompt (102). Thus, the non-preferred output (106) is different than the preferred output (104).

In the case of the non-preferred output (106), the output is deemed "non-preferred" or "worse" than the preferred output (104). The process of labeling the non-preferred output (106) is essentially similar to the labeling process of the preferred output (104), though the end result of labeling the output in question is the "non-preferred" label, thereby resulting in the non-preferred output (106).

The non-preferred output (106) is one of the triplets of information described above. As indicated above, each triplet includes the prompt (102), the preferred output (104) of the reference language model (118) when executed on the prompt (102), and the non-preferred output (106) of the reference language model (118) when executed on the prompt (102). Because multiple prompts are executed on the reference language model (118), multiple non-preferred outputs are stored in the data repository (100).

The data repository (100) also stores a policy score (108). The policy score (108) is a number generated based on an output of the training language model (120) during the training process described in FIG. 1B. The policy score (108) is a ratio between two probabilities. The first probability is the probability of the training language model (120) generating, when executing on the prompt (102), the preferred output (104). The second probability is the probability of the training language model (120) generating, when executing on the prompt (102), the non-preferred output (106). Use of the policy score (108) is described with respect to FIG. 1B.

The data repository (100) also stores a reference score (109). The reference score (109) is a number generated based on an output of the reference language model (118) during the training process described in FIG. 1B. The reference score (109) is a ratio between two probabilities. The first probability is the probability of the reference language model (118) generating, when executing on the prompt (102), the preferred output (104). The second probability is the probability of the reference language model (118) generating, when executing on the prompt (102), the non-preferred output (106). Use of the reference score (109) is described with respect to FIG. 1B.

The data repository (100) also stores a variable term (110). The variable term (110) is a term in the loss function (126), defined below, that varies according to a number of training steps performed during the training process. The training process and use of the variable term (110) is described with respect to FIG. 1B.

Figures 3C, 3D:
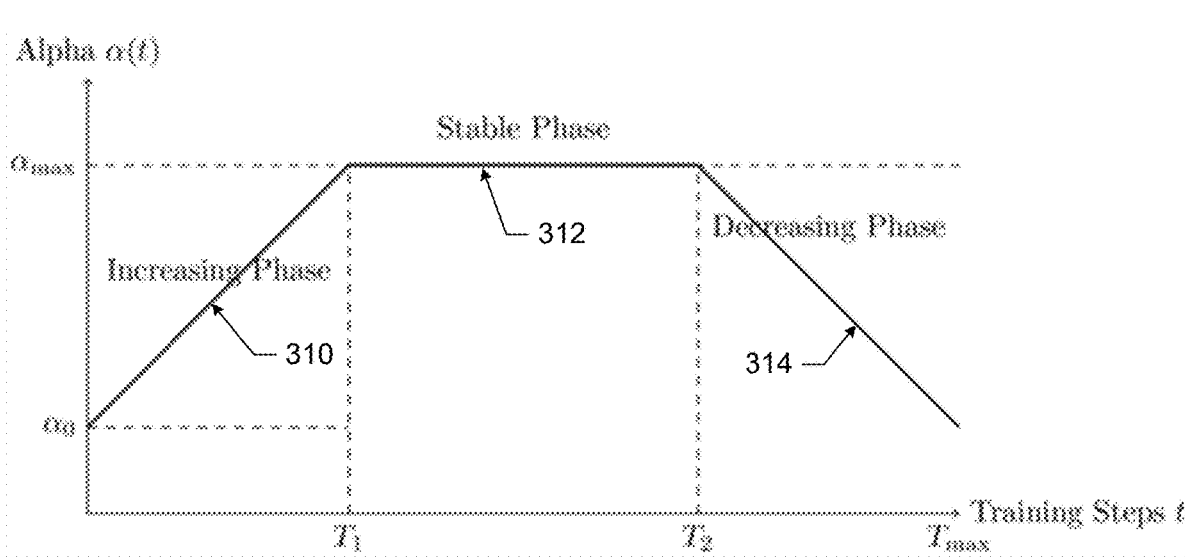

More formally, the variable term may be referred to by the symbol, $\alpha$, where $\alpha$ varies with the number of training steps. The variable term, $\alpha$, may be a quadratic function (e.g., a function that depends on a square of the training steps) that exhibits increasing values towards a maximum and then decreasing values towards convergence. The variable term also may be a function that initially increases with training steps, remains stable, and then decreases with training steps as the number of training steps approaches convergence. The variable term may be defined as shown in the example of FIG. 3D.

The data repository (100) also may store a loss (112). The loss (112) is one or more values output by the loss function (126), defined below. The loss (112) is used in training the training language model (120), as defined below. Training of the training language model (120) and use of the loss (112) is described with respect to FIG. 1B.

The system shown in FIG. 1 may include other components. For example, the system shown in FIG. 1 also may include a server (114). The server (114) is one or more computer processors, data repositories, communication devices, and supporting hardware and software. The server (114) may be in a distributed computing environment. The server (114) is configured to execute one or more applications, such as the reference language model (118), the updated language model (122), the training controller (124), and the server controller (128). An example of a computer system and network that may form the server (114) is described with respect to FIG. 4A and FIG. 4B.

The server (114) includes a computer processor (116). The computer processor (116) is one or more hardware or virtual processors which may execute computer readable program code that defines one or more applications, such as the reference language model (118), the training language model (120), the updated language model (122), the training controller (124), and the server controller (128). An example of the computer processor (116) is described with respect to the computer processor(s) (402) of FIG. 4A.

The server (114) also includes one or more language models, such as the reference language model (118), the training language model (120), and the updated language model (122). A language model is a natural language processing machine learning model. An example of a language model may be a large language model, such as CHATGPT® by OpenAI. However, different language models may be used. Training of the language models is described with respect to FIG. 1B, FIG. 2, and FIG. 3.

In particular, the reference language model (118) is a language model that remains unchanged during training, meaning that the parameters of the reference language model (118) do not change during training. Use of the reference language model (118) is described with respect to FIG. 1B, FIG. 2, and FIG. 3.

The training language model (120) is a language model that is trained during training, meaning that the parameters of the training language model (120) change during training. The training language model (120) may have a similar layer and node structure as the reference language model (118), but ultimately the trained parameters of the training language model (120) will be different than the parameters of the reference language model (118). Use and training of the training language model (120) is described with respect to FIG. 1B, FIG. 2, and FIG. 3.

The updated language model (122) is a language model, and in particular is the training language model (120) after convergence. In other words, after a final training step when convergence occurs, the training language model (120) is referred to the updated language model (122). The updated language model (122) has the parameter and weight values of the language model during an inference phase of machine learning (i.e., when the updated language model (122) is deployed for use processing new inputs).

The server (114) also includes a training controller (124). The training controller (124) is software or application specific hardware which, when executed by the computer processor (116), trains the training language model (120). The training controller (124) is described in more detail with respect to FIG. 1B.

During the training process described in FIG. 1B, the training controller (124) executes a loss function (126). The loss function (126), again, is a function that determines one or more values referred to as a loss. The loss is used to adjust the weights or parameters of the training language model (120) during training.

The loss function (126) takes the form of:

$$\text{Loss} = -\log\left(\sigma\left(\beta * \log\left(\frac{R_{policy}}{R_{reference}}\right)\right)\right), \qquad (1)$$

where "log" is a mathematical function, $\sigma$ is a hyperparameter, such as a sigmoid activation function, $R_{policy}$ is the policy score (108), and $R_{reference}$ is the reference score (109). The term $\beta$ is also a hyperparameter. The term $\beta$ depends on the type of DPO training being performed. In standard DPO training, $\beta$ is a constant. In one or more embodiments, $\beta$ varies with the number of training steps and thus is a function of the term, $\alpha$. In other words:

$$\beta = f(\alpha), \text{ where } \alpha \text{ varies with the number of training steps} \qquad (2)$$

Equation (1) represents the general form of a DPO loss function, as modified in one or more embodiments. However, the DPO loss function may take a more specific form, as shown in FIG. 3A.

The server (114) also may include a server controller (128). The server controller (128) is software or application specific hardware which, when executed by the computer processor (116), controls and coordinates operation of the software or application specific hardware described herein. The server controller (128) may execute the method of FIG. 2. The server controller (128) also may control and coordinate execution of the training controller (124), and thus also control and coordinate execution of the reference language model (118), the training language model (120), and the updated language model (122).

Attention is now turned to FIG. 1B. FIG. 1B shows the details of the training controller (124). FIG. 1B also shows the overall procedure for training an improved language model according to one or more embodiments.

Initially, a copy of the language model to be trained is made. Thus, prior to training, the training language model (120) and the reference language model (118) have the same weights, parameters, and node layer network. However, the weights or parameters of the training language model (120) are permitted to change during training, meaning that the training language model (120) is the model that is updated. In contrast, the weights or parameters of the reference language model (118) are reference (i.e., are not permitted to change). Thus, over each training step, the training language model (120) changes but the reference language model (118) does not change.

At the first training step, a triplet of a prompt (102), a preferred output (104), and a non-preferred output (106) are submitted as input to both the training language model (120) and a reference language model (118). In an embodiment, multiple triplets may be submitted to the training language model (120) and the reference language model (118). However, for clarity, the training controller (124) of FIG. 1B is described with respect to one triplet being submitted to the training language model (120) and the reference language model (118).

As described above, the training language model (120) is the neural network language model that is being trained and that, after training, becomes the improved language model (i.e., the updated language model (122)). The training language model (120) is commanded to determine, based on the triplet input, the probability that the preferred output (104) is correct and to determine, based on the triplet input, the probability that the non-preferred output (106) is correct. The former score (the likelihood of the preferred output (104) being correct) is the training chosen score (150). The latter score (the likelihood of the non-preferred output (106) being correct) is the training reject score (152).

The policy score (108) is then determined by taking the ratio of the training chosen score (150) to the training reject score (152). The policy score (108) is provided as input to the loss function (126), as described below.

As described above, the reference language model (118) is the neural network language model that is not permitted to change during training, and thus serves as a reference. The reference language model (118) is commanded to determine, based on the triplet input, the probability that the preferred output (104) is correct and to determine, based on the triplet input, the probability that the non-preferred output (106) is correct. The former score (the likelihood of the preferred output (104) being correct) is the reference chosen score (150). The latter score (the likelihood of the non-preferred output (106) being correct) is the reference reject score (152).

The reference score (109) is then determined by taking the ratio of the reference chosen score (156) to the reference reject score (158). The reference score (109) is provided as input to the loss function (126), as described below.

The loss function (126) then determines the loss (112) using a combination of the policy score (108) and the reference score (109). The loss function (126) is as defined with respect to the loss function (126) in FIG. 1A. Thus, for example, the loss function (126) may be of the form (126A) shown in FIG. 1B, where (as shown by the definition (126B)), the term $\beta$ is a function of $\alpha$, which varies with the number of training steps. A specific example of the loss function (126) is shown in FIG. 3A, a specific example of the definition (126B) is shown in FIG. 3B at beta modification (306), and a specific example of the term, $\alpha$, is shown in FIG. 3C having a number of phases as shown in FIG. 3D.

The output of the loss function (126) is the loss (112). The loss (112) is used to generate updated model parameters (162) for the training language model (120). The updated model parameters are applied to training language model (120), resulting in the updated language model (122) at a first training step.

A convergence (164) determination is then made. If convergence has not occurred, then training is not complete. The training controller (124) performs the step of incrementing the number of training steps (i.e., increment training step (166)). After the first training described above for FIG. 1B, the number of training steps is "1." The training process then iterates, whereupon, if convergence (164) has not occurred, then the number of training steps is 2. The number of training steps may vary, but could be many training steps (e.g., 100 or more).

However, when convergence (164) occurs, then the process terminates. When the training process terminates at the Nth step, the final version of the updated language model (122) (i.e., the training language model (120) after the Nth step) becomes the final, improved version of the language model.

While FIG. 1A and FIG. 1B show a configuration of components, other configurations may be used without departing from the scope of one or more embodiments. For example, various components may be combined to create a single component. As another example, the functionality performed by a single component may be performed by two or more components.

Figure 2A:
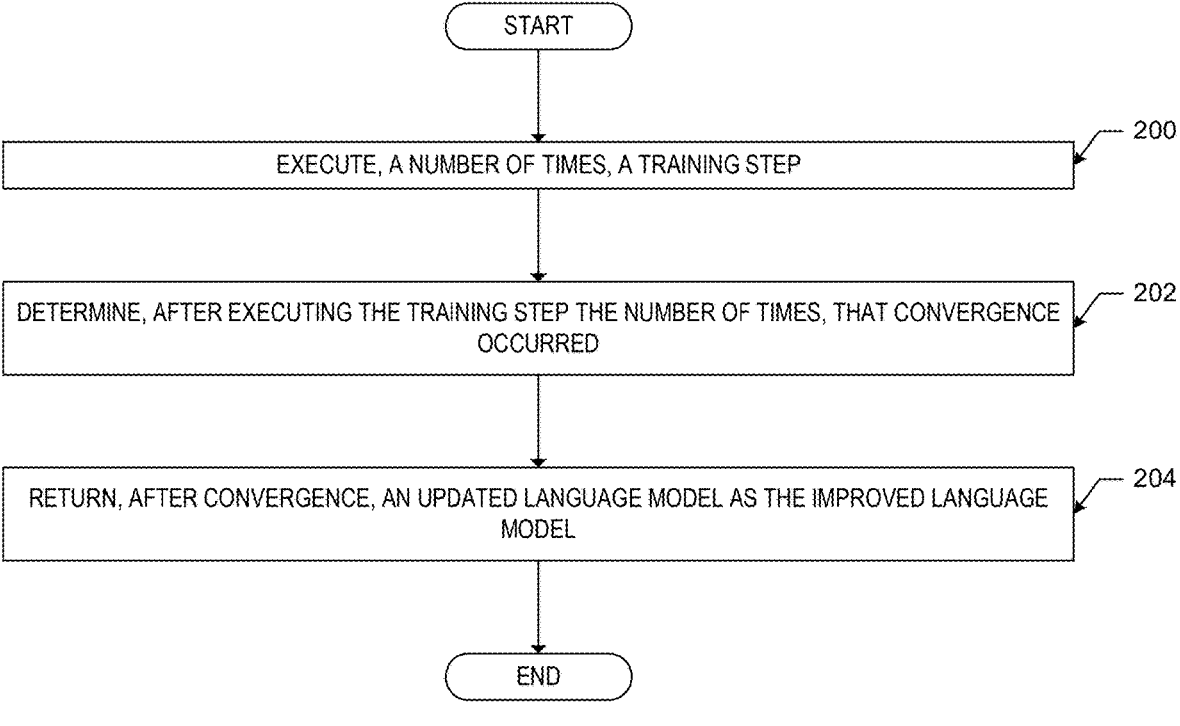
FIG. 2A and FIG. 2B show flowcharts of a method for language model training for direct preference optimization and generating a language model, in accordance with one or more embodiments.
Figure 2B:
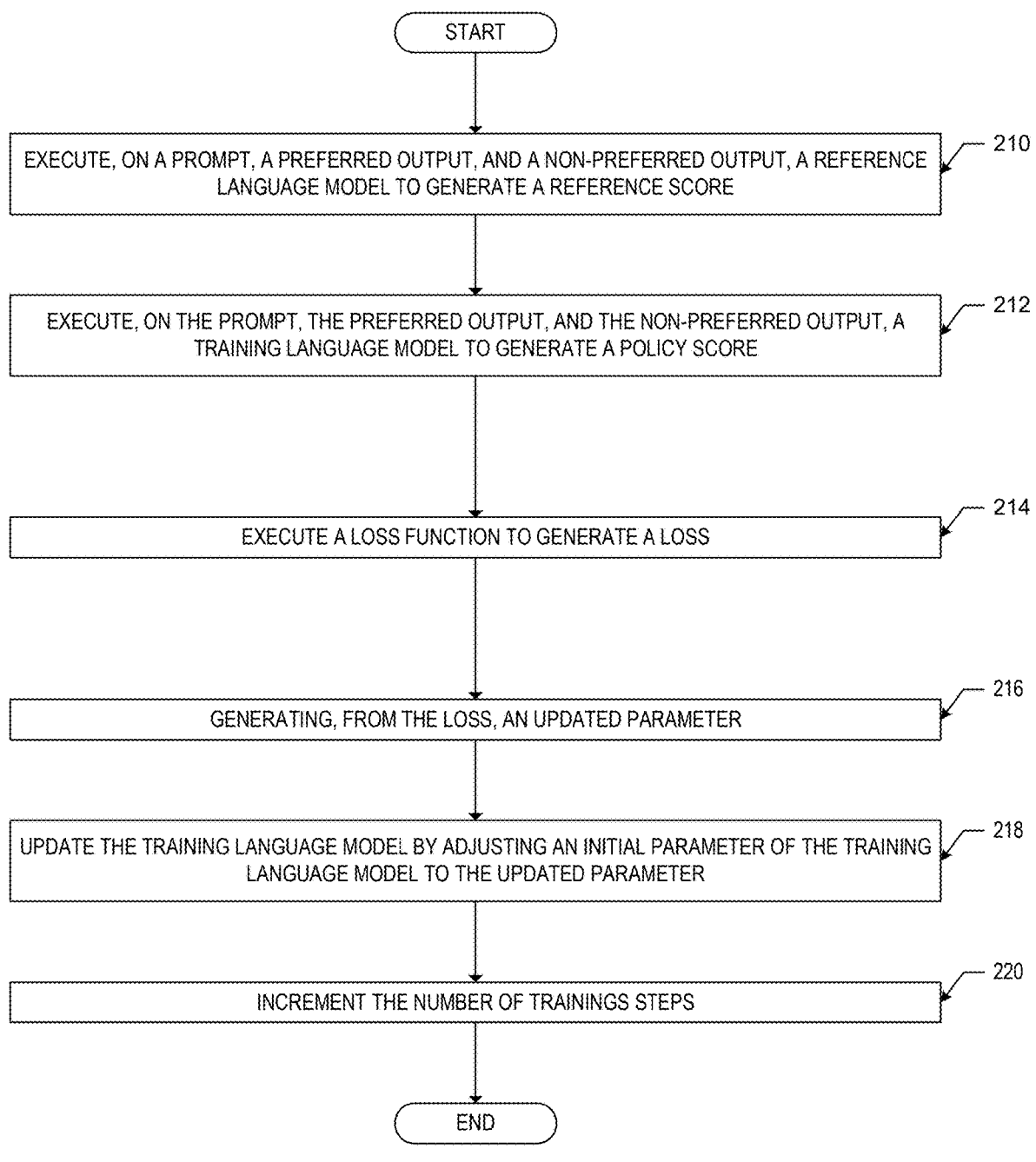

FIG. 2A and FIG. 2B show, when taken together, one flowchart of a method for language model training for direct preference optimization and generating an improved language model, in accordance with one or more embodiments. In particular, FIG. 2A shows the overall training method. FIG. 2B shows the details of training at step 200. The method of FIG. 2A and FIG. 2B may be referred to as a method for training an improved language model. The method of FIG. 2A and FIG. 2B may be implemented using the system of FIG. 1A and FIG. 1B, and one or more of the steps may be performed on or received at one or more computer processors. Specifically, FIG. 2A and FIG. 2B are example methods of the training controller (124) shown in FIG. 1A and FIG. 1B.

Referring first to FIG. 2A, step 200 includes executing, a number of times, a training step. The details of the training step are shown in FIG. 2B. Briefly, the training step trains the training model updating the weights or parameters of the model, thereby changing the model.

The training step improves an alignment of the improved language model to the preferred output over the non-preferred output, relative to the training language model. The training step also increases a stability of the improved language model relative to the training language model. Thus, each training step may improve the model incrementally.

Step 202 includes determining, after executing the training step the number of times, that convergence has occurred. Convergence is determined when a convergence condition is met. The convergence condition may occur when outputs of an updated version of the language model are within a quantitatively measured difference of expected outputs of the updated language model. The convergence condition may occur when the difference between the policy score and the reference score changes by less than a predetermined amount. The convergence condition may occur after a predetermined number of training steps.

Step 204 includes returning, after convergence, the updated language model as the improved language model. The updated language model may be returned by storing the updated language model. The updated language model may be returned by deploying the updated language model in an enterprise environment in order to process new queries. The updated language model may be returned by transmitting the updated language model to another computing device, or by granting another computing device access to the updated language model.

Attention is now turned to FIG. 2B. FIG. 2B is a submethod that occurs at step 200 of FIG. 2A. The sub-method of FIG. 2A, and hence the method of FIG. 2B, is performed iteratively until convergence.

Step 210 includes executing, on a prompt, a preferred output, and a non-preferred output, a reference language model to generate a reference score. Generation of the reference score may be performed as described with respect to FIG. 1B, as described with respect to the reference chosen score (156), the reference reject score (158), and the reference score (109).

Step 212 includes executing, on the prompt, the preferred output, and the non-preferred output, a training language model to generate a policy score. Generation of the policy score may be performed as described with respect to FIG.

1B, as described with respect to the reference chosen score (150), the reference reject score (152), and the policy score (108).

More generally, the training language model includes a neural network having a number of training parameters connecting layers of nodes in the neural network and the reference language model includes the neural network having a number of reference parameters connecting layers of nodes in the neural network. The training parameters are permitted to change during training and the reference parameters are unchangeable during training. The training language model outputs a training chosen score and a training reject score, and the reference language model outputs a reference chosen score and a reference reject score Step 214 includes executing a loss function. The loss function may be generated as described with respect to the loss function (126) in FIG. 1B according to the definition of the loss function (126) as described in FIG. 1A.

In general, the loss function includes a combination of the policy score and the reference score. The loss function further includes a hyperparameter (e.g., the function β) that modifies the combination of the policy score and the reference score. The hyperparameter includes a variable term, α, that varies with a number of training steps performed, including the training step.

In an embodiment, the variable term, α, includes a discontinuous function of the number of training steps. Alternatively, the variable term, α, includes a continuous second order function of the number of training steps. In an embodiment, the variable term, α, includes an increasing phase, a stable phase, and a decreasing phase. During the increasing phase, a value of the variable term, α, increases with the number of training steps. During the stable phase, the value of the variable term, α, remains unchanged with the number of training steps. During the decreasing phase, the value of the variable term, α, decreases with the number of training steps.

In an embodiment, as shown in FIG. 3D, during the increasing phase, a value of the variable term, α, increases with the number of training steps according to a constant, combined with a proportion of a current number of training steps to a first predetermined number of training steps defining the increasing phase. During the stable phase, the value of the variable term, α, remains unchanged with the number of training steps, and the value of the variable term, α, includes a maximum value until a second predetermined number of training steps defining the stable phase. During the decreasing phase, the value of the variable term, α, decreases with the number of training steps according to a combination of the maximum value and a combined ratio of a maximum number of training steps, the current number of training steps, and the second predetermined number of training steps.

Executing the loss function also may include determination of component functions within the loss function. For example, executing the loss function also may include determining, from the training chosen score and the training reject score, the policy score. Executing the loss function also may include determining, from the reference chosen score and a reference reject score, the reference score. The loss function is therefore based on the policy score, the reference score, and the hyperparameter.

The end result of executing the loss function is to output a loss. The loss is used in the following step in the iteration.

Step 216 includes generating, from the loss, an updated parameter. The loss may be one or more values. For example, the loss may be one or more numbers that are multiplied by (or otherwise combined with) one or more parameters of the neural network of the training language model. In this manner, the parameters of the neural network are updated and changed. Accordingly, the behavior of the model is changed. More specifically, the behavior of the model is improved in that, with the updated parameters, the updated language model is more likely to generate preferred outputs and is more likely to be stable during use over time.

Step 218 includes updating the training language model by adjusting an initial parameter of the training language model to the updated parameter. In an embodiment, steps 216 and 218 are accomplished in a single step, such as by combining the loss with the parameters of the training language model without an intervening step of determining updates to the parameters. Updating generates an updated language model.

Step 220 includes incrementing the number of trainings steps. Each time step 210, step 212, step 214, step 216, and step 218 are performed, the number of training steps at step 220 is increased by 1. Because the loss function may vary with the number of training steps, step 220 effectively changes the loss generated at step 216.

While the various steps in the flowchart of FIG. 2A and FIG. 2B are presented and described sequentially, at least some of the steps may be executed in different orders, may be combined or omitted, and at least some of the steps may be executed in parallel. Furthermore, the steps may be performed actively or passively.

FIG. 3A, FIG. 3B, FIG. 3C, and FIG. 3D show an example of language model training for direct preference optimization and generation of an improved language model, in accordance with one or more embodiments. The following example is for explanatory purposes only and not intended to limit the scope of one or more embodiments. The example of FIG. 3A through FIG. 3D may be performed using the system of FIG. 1A and FIG. 1B. The example of FIG. 3B is an example of an implementation of the method of FIG. 2A and FIG. 2B.

FIG. 3A shows a DPO loss function (300). The DPO loss function may take the form:

$$\mathcal{L}_{DPO}(\pi_\theta; \pi_{ref}) = -\mathbb{E}_{(x,y_w,y_1)\sim\mathcal{D}}\left[\log_\sigma\left(\beta\log\frac{\pi_\theta(y_w|x)}{\pi_{ref}(y_w|x)} - \beta\log\frac{\pi_\theta(y_1|x)}{\pi_{ref}(y_1|x)}\right)\right] \quad (3)$$

As shown in FIG. 3A. In the above equation, the term $\mathcal{L}_{DPO}$ represents the loss. The term $\pi_\theta$ represents the training language model policy at any given iteration of training. The term $\pi_{ref}$ represents the base reference policy for the initial model. The term $-\mathbb{E}_{(x,y_w,y_1)\sim D}$ is an operator that operates on prompts, x, to produce pairs of a preferred output, y1, and a non-preferred output, y2. The term yw refers to an output that has a label that is applied to the most preferred. The term $\mathcal{D}$ is a static dataset of comparisons, where $$\mathcal{D} = \{\{x^{(i)}, y_w^{(i)}, y_l^{(i)}\}_{i=1}^N.$$

The term "i" refers to the "ith" instance of an answer under consideration. The term $y_l$ denotes a non-preferred output. The term "log" is a mathematical operator. The term β is a parameter controlling the deviation from the base reference policy $\pi_{ref}$. The term β is a function of α, which varies with the number of training steps, as described above.

FIG. 3B shows a sample program for executing a training step, as in FIG. 2B. The program (302) includes the computation of an adaptive alpha scheduling component (304), as shown in FIG. 3B. In turn, the adaptive alpha scheduling component (304) is used to modify the hyperparameter, $\beta$, as shown at beta modification (306) step. Because $\beta$ is a function of $\alpha$, and because $\alpha$ varies with the number of training steps, $\beta$ will also vary with the number of training steps.

FIG. 3B also shows a number of comments, such as comment (307), indicated by right-facing triangles. The comments indicate the purpose of a series of lines of pseudo code until the next comment (or until the end of the algorithm).

FIG. 3C shows an example of the definition of the term $\alpha$ at any given training step in the form of the adaptive alpha scheduling component (304) as shown. As indicated, the term $\alpha$ varies with the number of training iterations, t. The term $\alpha_0$ is an initial number determined by a computer scientist (e.g., 0 or a small number for the first training step, $t_1$). The term $\alpha_{max}$ is the maximum permitted value of $\alpha$, and is a constant value. The term "T" refers to a predetermined number of training iterations. For example, the term $T_1$ is a first number of training iterations and the term $T_2$ is a second number of training iterations greater than $T_1$. The term $T_{max}$ is the maximum number of training iterations that may occur during the iterative training process.

FIG. 3D shows a graph (308) of the effect of the adaptive alpha scheduling component (304) shown in FIG. 3C over the number of training iterations. During an increasing phase (310), the value of a increases with the number training iteration, starting with the first training iteration. Once the number of training iterations reaches $T_1$, the value of $\alpha$ reaches a maximum. During the stable phase (312) the maximum value of $\alpha$ is consistently applied at each iteration, and thus does not change as the training iterations continue. However, once the number of training iterations reaches $T_2$, a decreasing phase (314) begins. During the decreasing phase (314), the value of $\alpha$ decreases with the number of training iterations, until reaching either a minimum value of $\alpha$ (e.g., $\alpha_o$ or "0") or until the number of training iterations reaches a maximum, $T_{max}$.

The adaptive alpha scheduling component (304) shown in FIG. 3C and visualized in FIG. 3D has been empirically shown to result in a language model that is both more likely to generate preferred output, and more stable than other reasoning language models. Thus, the adaptive alpha scheduling component (304) (or other variations of a as described with respect to FIG. 1A and FIG. 1B) may be used to train an improved language model having improved capabilities and more stable output characteristics. Accordingly, one or more embodiments has shown a technical solution to a technical problem.

One or more embodiments may be alternatively described as follows. One or more embodiments provide for a scheduler for an alpha ($\alpha$) component that changes over the course of training, allowing the dynamic $\beta$ mechanism to adjust more appropriately. The value of $\alpha$ is kept near zero in the early stage for stability. The value of $\alpha$ is ramped up to be higher in the middle of training, thereby amplifying dynamic beta updates. The value of $\alpha$ is then reduced at the end of training to fine-tune the policy gently. The staged approach balances stability, aggressive learning, and careful final refinement, and thereby results in an improved model that has better accuracy (i.e., is more likely to generate preferred outputs) and has better stability.

One or more embodiments provide for an alpha scheduler. The alpha scheduler includes splitting the training process into three phases: an initial phase (from step 0 to $T_1$), a middle phase (from $T_1$ to $T_2$), and a final phase (from $T_2$ to the end). In the initial phase, a starts near zero and increases gradually to alpha_max by $T_1$. The initial phase prevents overly large policy updates when the model is still adjusting to preference data. In the middle phase, $\alpha$ stays at alpha_max, encouraging more pronounced scaling of reward discrepancies for dynamic beta. Thus, in the middle phase, stronger parameter updates toward preferred responses are rewarded. In the final phase, $\alpha$ gradually decreases again, helping the model converge without overshooting or overfitting on any single set of preferences.

One or more embodiments are integrated by way of a dynamic beta ($\beta$) that depends on $\alpha$. At each training step, the average discrepancy in the batch is determined. The discrepancy is scaled by $\alpha(t)$ when calculating the value of $\beta$ for the batch. Thus, beta is dynamically adapted. However, the aggressiveness of the adaptation is governed by $\alpha(t)$, which evolves with the training phases.

One or more embodiments provide for smooth transitions. To avoid abrupt changes, a can be updated smoothly (for example, linearly or with a cosine schedule) from phase to phase. Thus, different functions of the number of training iterations may be used to express the value of $\alpha$ at a given training iteration.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
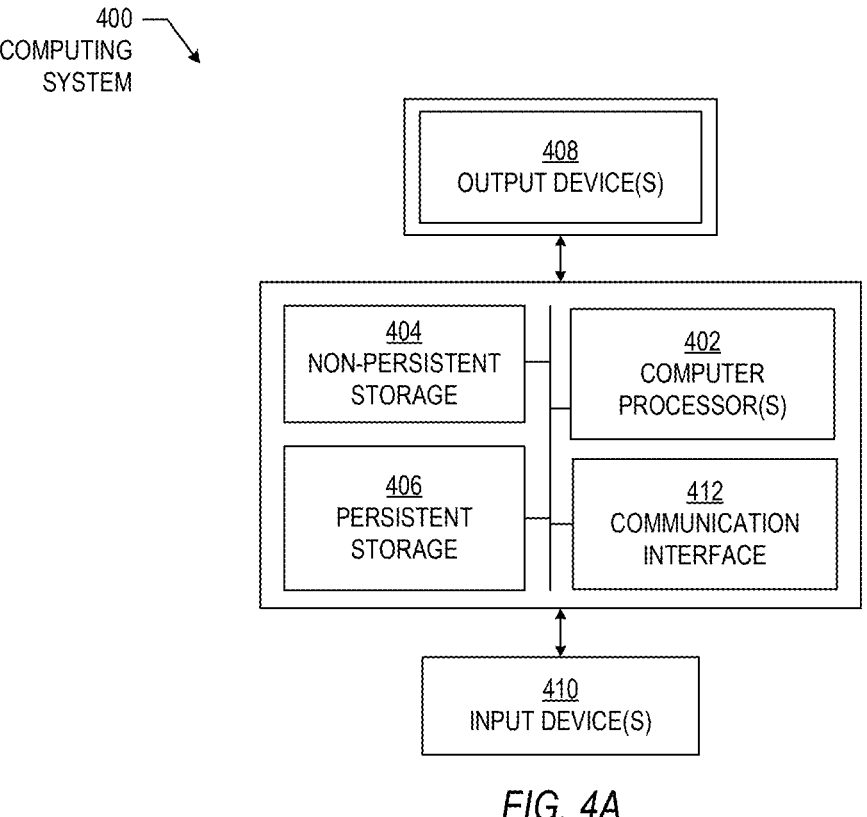
FIG. 4A and FIG. 4B show a computing system and network environment, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or microcores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN), such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
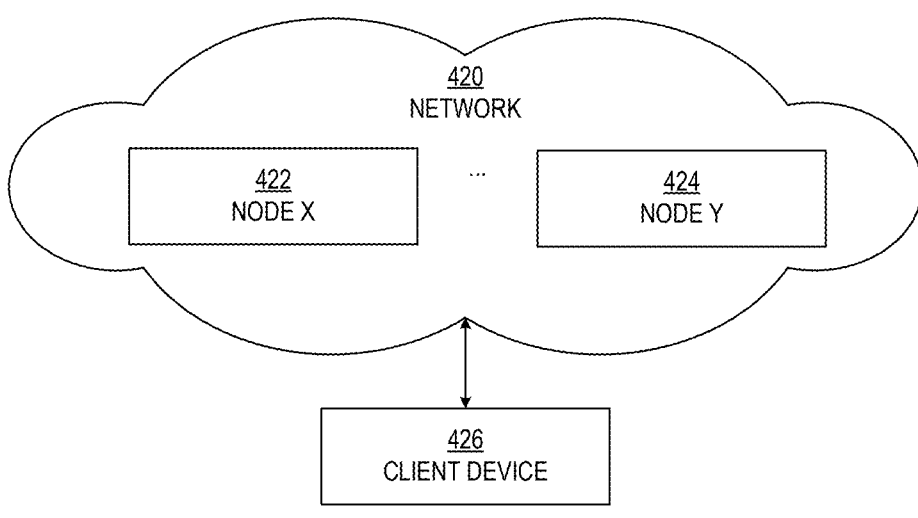

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method for training a language model, the method comprising:

executing, a plurality of times, a training step, wherein the training step comprises:

executing, on a prompt, a preferred output, and a non-preferred output, a reference language model to generate a reference score;

executing, on the prompt, the preferred output, and the non-preferred output, a training language model to generate a policy score;

executing a loss function, wherein:

the loss function comprises a combination of the policy score and the reference score, the loss function further comprises a hyperparameter that modifies the combination of the policy score and the reference score, the hyperparameter comprises a variable term, $\alpha$, wherein $\alpha$ varies with a number of training steps performed, including the training step, and executing the loss function outputs a loss;

generating, from the loss, an updated parameter;

updating the training language model by adjusting an initial parameter of the training language model to the updated parameter, wherein updating generates an updated language model; and incrementing the number of trainings steps;

determining, after executing the training step the plurality of times, that convergence has occurred; and returning, after convergence, the updated language model as an improved language model.

2. The method of claim 1, wherein the training step improves an alignment of the improved language model to the preferred output over the non-preferred output, relative to the training language model.

3. The method of claim 1, wherein the training step increases a stability of the improved language model relative to the training language model.

4. The method of claim 1, wherein the training language model comprises a neural network having a plurality of training parameters connecting layers of nodes in the neural network and the reference language model comprises the neural network having a plurality of reference parameters connecting layers of nodes in the neural network.

5. The method of claim 4, wherein the training parameters are permitted to change during training and the reference parameters are unchangeable during training.

6. The method of claim 4, wherein the training language model outputs a training chosen score and a training reject score, and the reference language model outputs a reference chosen score and a reference reject score.

7. The method of claim 6, wherein the training step further comprises:

determining, from the training chosen score and the training reject score, the policy score; and determining, from the reference chosen score and the reference reject score, the reference score.

8. The method of claim 7, wherein the loss function is based on the policy score, the reference score, and the hyperparameter.

9. The method of claim 1, wherein the variable term, $\alpha$, comprises a discontinuous function of the number of training steps.

10. The method of claim 1, wherein the variable term, $\alpha$, comprises a continuous second order function of the number of training steps.

11. The method of claim 1, wherein the variable term, $\alpha$, comprises an increasing phase, a stable phase, and a decreasing phase.

12. The method of claim 11, wherein:

during the increasing phase, a value of the variable term, $\alpha$, increases with the number of training steps, during the stable phase, the value of the variable term, $\alpha$, remains unchanged with the number of training steps, and during the decreasing phase, the value of the variable term, $\alpha$, decreases with the number of training steps.

13. The method of claim 11, wherein:

during the increasing phase, a value of the variable term, $\alpha$, increases with the number of training steps according to a constant combined with a proportion of a current number of training steps to a first predetermined number of training steps defining the increasing phase, during the stable phase, the value of the variable term, $\alpha$, remains unchanged with the number of training steps, and the value of the variable term, $\alpha$, comprises a maximum value until a second predetermined number of training steps defining the stable phase, and during the decreasing phase, the value of the variable term, $\alpha$, decreases with the number of training steps according to a combination of the maximum value and a combined ratio of a maximum number of training steps, the current number of training steps, and the second predetermined number of training steps.

14. A system for training a language model, the system comprising:

a computer processor;

a data repository in communication with the computer processor and storing:

a prompt, a preferred output, a non-preferred output, a reference score, a policy score, a variable term, $\alpha$, wherein $\alpha$ varies with a number of training steps performed, a loss function, wherein:

the loss function comprises a combination of the policy score and the reference score, the loss function further comprises a hyperparameter that modifies the combination of the policy score and the reference score, and the variable term, $\alpha$, varies with the number of training steps performed, a loss output by executing the loss function;

a reference language model comprising a reference initial parameter and executable by the computer processor;

a training language model comprising an updatable parameter and executable by the computer processor;

an updated language model comprising the training language model having a final updated parameter and executable by the computer processor;

a training controller which, when executed by the computer processor, executes, a plurality of times, a training step of the number of training steps, wherein the training step comprises:

executing, on the prompt, the preferred output, and the non-preferred output, the reference language model to generate the reference score;

executing, on the prompt, the preferred output, and the non-preferred output, the training language model to generate the policy score;

executing the loss function to output the loss;

generating, from the loss, an update to the updatable parameter, updating the training language model by adjusting the updatable parameter of the training language model according to the update, and incrementing the number of trainings steps; and a server controller executable by the computer processor to:

determine, after executing the training step the plurality of times, that convergence has occurred, and return, after convergence, the updated language model as an improved language model.

15. The system of claim 14, wherein:

the training step improves an alignment of the improved language model to the preferred output over the non-preferred output, relative to the training language model, and the training step increases a stability of the improved language model relative to the training language model.

16. The system of claim 14, wherein:

the training language model comprises a neural network having a plurality of training parameters connecting layers of nodes in the neural network and the reference language model comprises the neural network having a plurality of reference parameters connecting layers of nodes in the neural network, the plurality of training parameters are permitted to change during the training step, and include the updatable parameter, the plurality of reference parameters are unchangeable during the training step, and include the reference initial parameter, the training language model, during the training step, outputs a training chosen score and a training reject score, and the reference language model, during the training step, outputs a reference chosen score and a reference reject score.

17. The system of claim 16, the training step further comprises:

determining, from the training chosen score and the training reject score, the policy score; and determining, from the reference chosen score and a reference reject score, the reference score.

18. The system of claim 17, wherein the loss function is based on the policy score, the reference score, and the hyperparameter.

19. The system of claim 14, wherein the variable term, $\alpha$, comprises an increasing phase, a stable phase, and a decreasing phase, wherein:

during the increasing phase during the training step, a value of the variable term, $\alpha$, increases with the number of training steps, during the stable phase during the training step, the value of the variable term, $\alpha$, remains unchanged with the number of training steps, and during the decreasing phase during the training step, the value of the variable term, $\alpha$, decreases with the number of training steps.

20. A method for training a language model, the method comprising:

executing, a plurality of times, a training step, wherein the training step comprises:

executing, on a prompt, a preferred output, and a non-preferred output, a reference language model to generate a reference score;

executing, on the prompt, the preferred output, and the non-preferred output, a training language model to generate a policy score;

executing a loss function, wherein:

the loss function comprises a combination of the policy score and the reference score, the loss function further comprises a hyperparameter that modifies the combination of the policy score and the reference score, the hyperparameter comprises a variable term, $\alpha$, wherein $\alpha$ varies with a number of training steps performed, including the training step, wherein the variable term, $\alpha$, comprises an increasing phase, a stable phase, and a decreasing phase, wherein:

during the increasing phase, a value of the variable term, $\alpha$, increases with the number of training steps, during the stable phase, the value of the variable term, $\alpha$, remains unchanged with the number of training steps, and during the decreasing phase, the value of the variable term, $\alpha$, decreases with the number of training steps, and executing the loss function outputs a loss, generating, from the loss, an updated parameter;

updating the training language model by adjusting an initial parameter of the training language model to the updated parameter, wherein updating generates an updated language model; and incrementing the number of trainings steps;

determining, after executing the training step the plurality of times, that convergence has occurred; and returning, after convergence, the updated language model as an improved language model, wherein:

the training step improves an alignment of the improved language model to the preferred output over the non-preferred output, relative to the training language model, and the training step increases a stability of the improved language model relative to the training language model.

* * * * *